United States Patent
Airesman

[11] 3,910,363
[45] Oct. 7, 1975

[54] WEIGHING DEVICE FOR FORK LIFT TRUCK

[75] Inventor: Charles D. Airesman, Cumberland, Md.

[73] Assignee: Allegany Technology Inc., Cumberland, Md.

[22] Filed: Dec. 27, 1974

[21] Appl. No.: 536,746

[52] U.S. Cl. .................................. 177/139; 177/140
[51] Int. Cl.² ......................................... G01G 19/08
[58] Field of Search ........................... 177/136–140, 177/210; 73/141 R, 141 AB

[56] References Cited
UNITED STATES PATENTS

| | | | |
|---|---|---|---|
| 2,643,781 | 6/1953 | Wise | 177/139 |
| 2,822,095 | 2/1958 | Buckingham | 177/139 |
| 3,062,308 | 11/1962 | Anderson | 177/139 |
| 3,196,966 | 7/1965 | Kennedy | 177/139 |
| 3,231,035 | 1/1966 | Wise | 177/139 |

Primary Examiner—Stephen J. Tomsky
Assistant Examiner—Vit W. Miska
Attorney, Agent, or Firm—Albert J. Santorelli

[57] ABSTRACT

A weighing system for use with a fork lift truck and the like having a stationary plate mounted to the fork lift truck, a moveable plate, the forks of the fork lift truck being mounted thereto, and flexure elements mounted to the stationary and moveable plates to maintain said plates in substantially vertical parallel relationship. A load cell is coupled at one end through flexure means to the stationary plate, and at its other end through additional flexure means to the moveable plate, the moveable plate being pulled vertically downwardly when a load is placed on the forks to thereby put the load cell in tension. The load cell comprises a strain gauge which converts the tension forces applied thereto as a result of downward movement of the moveable plate to a proportionate electrical signal, that is converted to a visual indication of the weight under measurement on the forks. Overload stop means are provided to limit the downward vertical movement of the moveable plate to prevent damage to the load cell, and structured to prevent overloads from pulling the moveable plate away from the stationary plate, which in conjunction with the flexure elements previously described prevents undue strain from being applied to the weighing structure and particularly the load cell. Additional stop means are provided to inhibit materials which might be caught underneath the forks from pushing the forks upwardly to prevent corresponding movement of the moveable plate from damaging the load cell.

15 Claims, 3 Drawing Figures

WEIGHING DEVICE FOR FORK LIFT TRUCK

BACKGROUND OF THE INVENTION

1. Field of the Invention

The invention relates to a weighing device for use in conjunction with fork lift trucks and the like.

2. Description of the Prior Art

There are devices known in the prior art whereby fork lift trucks may be adapted to weigh loads carried by the forks. It is also known in the prior art that flexure elements may be utilized in weighing devices associated with fork lift trucks for connecting a cross head to the fork so that the same are held in substantially rigid relation in a horizontal plane but allowed to have movement relative to each other in a vertical plate; note the Buckingham U.S. Pat. No. 2,822,095 and the Kennedy U.S. Pat. No. 3,196,966.

SUMMARY OF THE INVENTION

The present invention relates to a weighing device for use with a fork lift truck having a relatively simple structure compared to the prior art, and which further provides a strong and accurate weighing system. A stationary plate is mounted to the fork lift truck and flexure elements are mounted to the stationary plate and a moveable plate to maintain said plates in substantially vertical parallel arrangement. At least one load cell is interposed between the moveable and stationary plates, with one end of the load cell being connected through other flexure means to the moveable plate, the other end of the load cell being connected through additional other flexure means to the moveable plate.

The described configuration is particularly strong and prevents bending moments resulting from the cantilever effect of loads being placed at different locations on the forks from causing the load cell to be responsive thereto, thereby insuring accurate weight measurements and preventing damage to the load cell. Thus the load cell only sees the vertical download, with the flexure means bending in response to the cantilever effect in equal and opposite direction. Upper and lower stop means limit the vertical movement of the moveable plate. The upper stop means prevents overloading of the forks from damaging the load cell, and the lower stop means prevents materials which might get caught underneath the forks from pushing the forks and moveable plate upwardly to a point where the load cell would be damaged. The load cell comprises conventional strain gauge means connected in an electrical circuit to provide a visual indication, such as for example, a digital display, of the weight of the load under measurement carried by the forks.

DETAILED DESCRIPTION OF THE INVENTION

Figure 1:
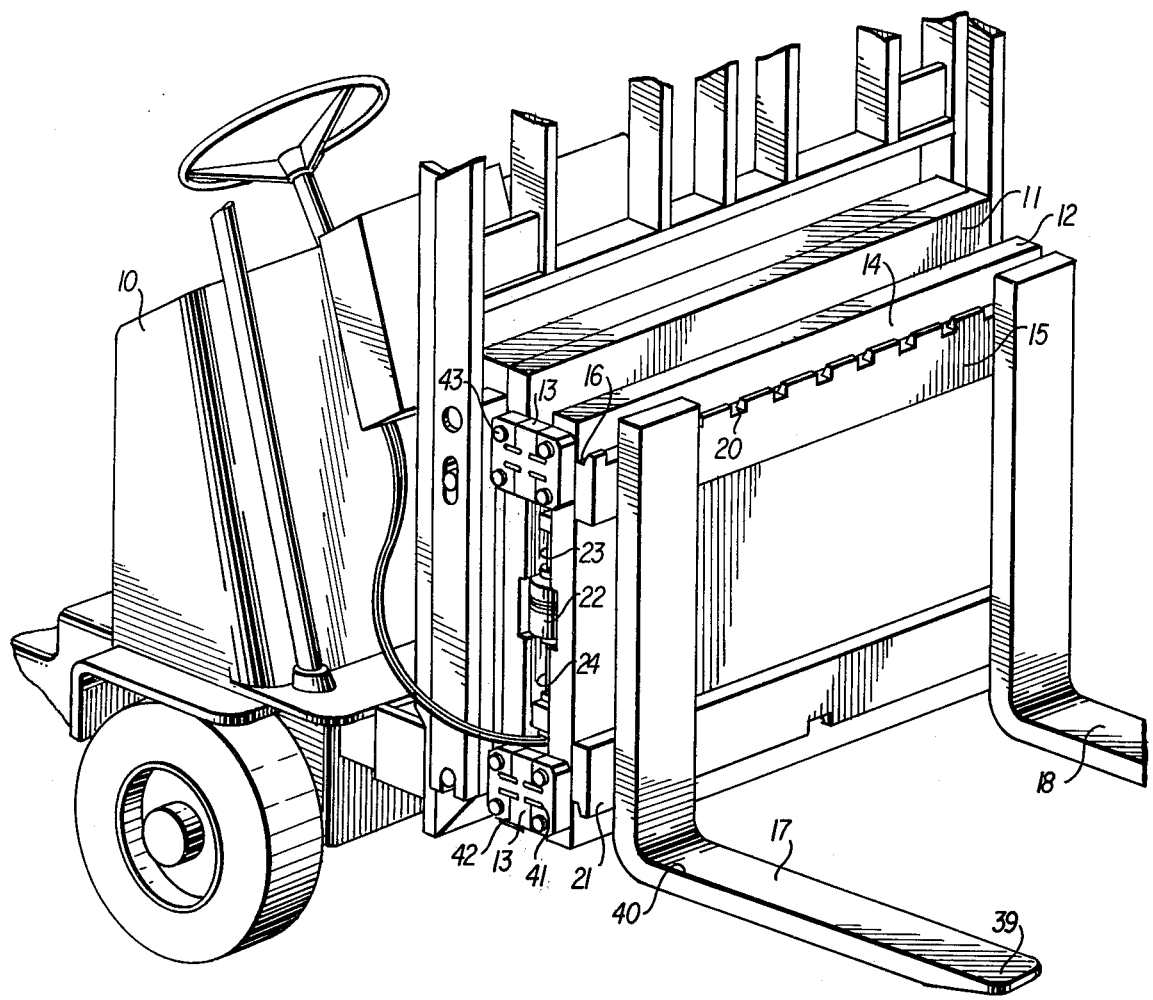
FIG. 1 is a fragmentary perspective view of a fork lift truck with the fork lift weighing device according to the invention.
Figure 2:
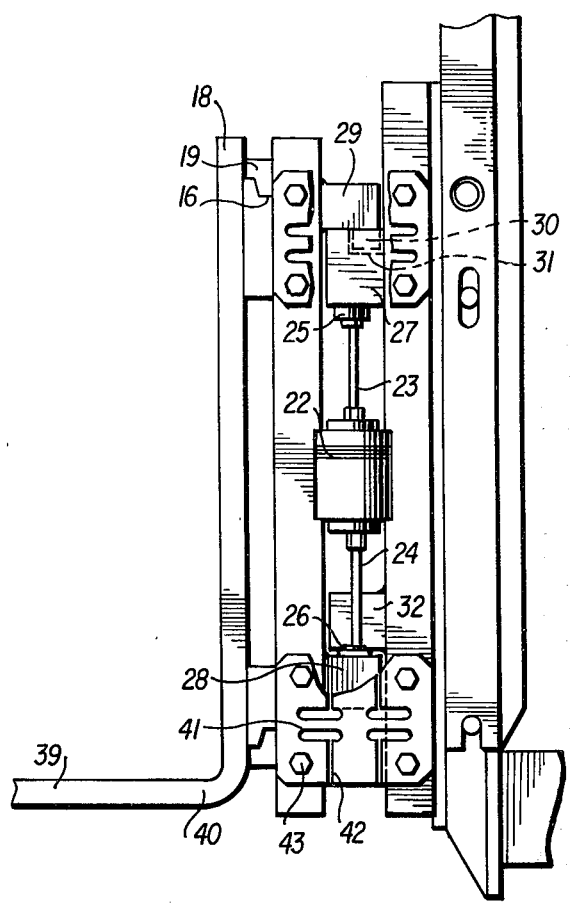
FIG. 2 is a side view of the weighing device according to the invention.

FIG. 1 shows a fragmentary view of a conventional fork lift truck 10 and the weighing device according to the invention connected to the front portion thereof. Stationary plate 11 is mounted to the front of fork lift truck 10 by conventional means such as welding and/or bolts (not shown). Individual flexure elements 13 are bolted and welded at the upper and lower ends of both sides of stationary plate 11 and moveable plate 12, as described in detail hereinafter. Moveable plate 12 is maintained in substantially vertical parallel relationship with respect to stationary plate 11 by flexure elements 13. A bar 15 defining groove 16 is mounted near the top of the frontal surface 14 of moveable plate 12. The forks 17 and 18 each have a clamping means 19 on the back surfaces thereof as shown in FIG. 2, which extend through one of slots 20 to lock the forks into groove 16. The forks 17 and 18 may be securely mounted to bar 15 by bolting and/or welding. A plurality of slots 20 are shown in FIG. 1 to enable varying the positioning of the forks 17 and 18 along bar 15. A lower bar 21 defining a groove is mounted near the bottom of moveable plate 12, and a similar arrangement is utilized to secure the corresponding lower portion of the forks 17 and 18 thereto. The forks 17 and 18 are thus rigidly mounted to bars 15 and 21 and their vertical movement is transmitted to moveable plate 12.

Figure 3:
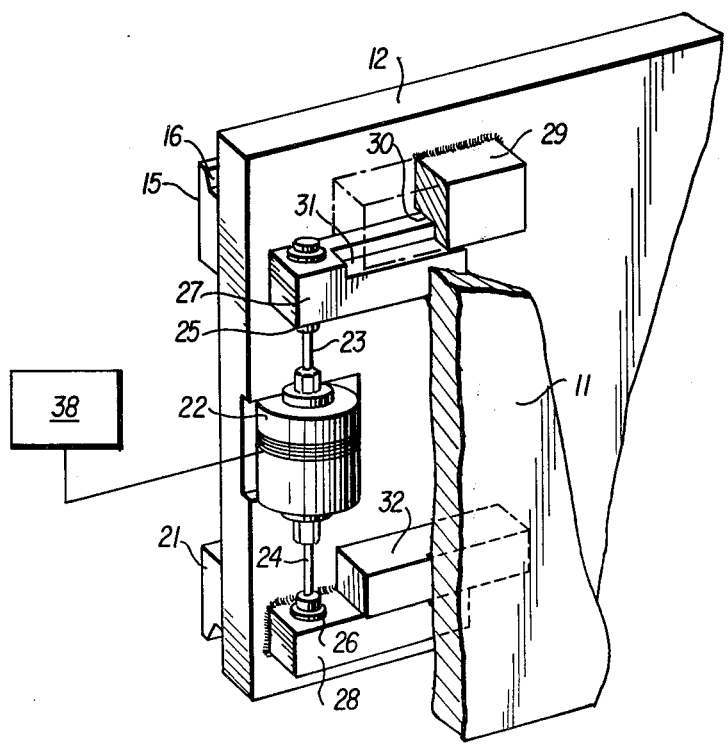
FIG. 3 is a fragmentary perspective view looking from the fork lift truck towards the moveable plate, the stationary plate being shown in fragmentary form.

Load cells 22 are interposed between the stationary plate 11 and the moveable plate 12 near the outer sides thereof as shown in FIG. 1. Although one load cell may be utilized, in the preferred embodiment of the invention, a load cell is positioned near each outer side of moveable plate 12 and stationary plate 11 for balancing purposes (FIG. 3). The load cells are conventional in the art, and consequently are not described in detail herein. Each load cell comprises a strain gauge, connected to electronic weight measurement instrument 38, which converts the measured weight to a visual indication such as a digital display. Thus, a given weight applied to the forks 17 and 18 will force the forks vertically downwardly a distance dependent upon the weight. The moveable plate 12 correspondingly moves downwardly applying a tension force to the load cell 22 proportionate to the weight, and this is converted by the strain gauge to an electrical signal which is fed to the electronic weight measurement instrument 38.

Flexure elements comprising steel rods 23 and 24 are connected to opposite ends of each load cell 22. The other ends of flexure elements 23 and 24 are connected to mounting means 25 and 26 respectively. Mounting block 27 is rigidly mounted to stationary plate 11, and the mounting means 25 is rigidly mounted to the mounting block 27 by conventional means such as bolting and/or welding. Mounting block 28 is connected to moveable plate 12, and the mounting means 26 is secured thereto by conventional means, such as bolting and/or welding. Consequently, a load placed on the forks 17 and 18 will place the load cells 22 in tension.

Upper and lower limit stop means are also provided to prevent damage to the load cell as described hereinafter. Upper limit stop 29 is mounted to the moveable plate 12 and defines a shoulder portion 30 which interfits with the corresponding section 31 of the mounting block 27. If an overload is placed on the forks, moveable plate 12 will move vertically downward. If the forks are overloaded, stop means 29 will hit block 27 and further downward movement of the moveable plate will be restrained. Consequently, the overload will not damage critical parts of the structure such as the load cell. Under the condition, when there is no load on the forks, the distance between stop means 29 and mounting block 27 is preset to determine maxiumum downward movement of moveable plate 12 which will be allowed without damage to the load cell, and consequently to set the overload limit.

The described shoulder connection of stop 29 and mounting block 27 prevents moveable plate 12, in the event of an overload, from being pulled away from its normal vertically parallel position with respect to stationary plate 11. It thus prevents an overload from presenting undue strain to the system, in conjunction with the structure, such as, flexures 13 and flexure elements 23 and 24.

Lower limit stop 32 is connected to the stationary plate 11 and functions to prevent materials which might accidentally be caught under forks 17 and/or 18 from pushing the moveable plate 12 upwardly resulting in damage to the load cells. Thus, stop 32 is displaced from mounting block 28 by a predetermined distance, and if the forks 17 and/or 18 are pushed upwardly this distance, stop means 32 will restrain further movement of the forks, and consequently the moveable plate 12, thereby preventing damage to the load cells.

When a load is picked up by the forks 17 and 18, it will cause the forks and moveable plate 12 to be pulled down. The flexure elements 13, tend to keep stationary plate 11 and moveable plate 12 substantially vertically parallel and therefore the downward movement of the moveable plate 12 will place the load cells 22 in tension, the tension force depending upon the weight of the load. The strain gauge of the load cell will produce a corresponding electrical signal which is transmitted to the electrical measurement instrument 38 for conversion of the electrical signal into a visual indication of the weight of the load.

Placing the same load at different locations on the forks, that is for example from toe 39 to heel 40, causes different cantilever effects to be presented to the weighing system. This introduces different bending moments at the upper and lower portions of the weighing structure. Flexure elements 23 and 24 offset such bending moments by preventing the load cells from responding to cantilever effects. That is, bending moments caused by the cantilever effect, which tend to disturb the vertical parallel relationship of stationary plate 11 and moveable plate 12, will act on flexure elements 23 and 24 in an equal and opposite direction and these flexure elements will absorb the bending forces and maintain the load cells in substantially vertical position such that it provides an accurate measurement of the weight, no matter where it is placed on the forks. Thus the steel rods comprising flexure elements 23 and 24 will bend sidewise in opposite directions before the load cell "sees" the bending moments causing the load cell to be responsive only to the direct force of the load and not any bending moments. The rod flexure assembly thus keeps any out of parallel deflections from showing up in the load cell, and also will assume any side loads to allow for side deflections. If an overload is placed on the forks, the upper stop 29 previously described will function to prevent damage to the load cells.

The flexure elements 13 essentially comprise steel blocks having slits and cut-out sections 42 and 41 respectively and are shown mounted to the end portions of stationary plate 11 and moveable plate 12, at the upper and lower ends thereof. Alternatively, the flexure elements may be interposed between the plates in grooves defined thereby and may comprise other configurations without departing from the scope of the invention. The flexure elements have bolts 43 which may be loosened to adjust for heel-toe differences in the forks. The flexures are thus adjustable to provide proper alignment of flexure elements and plates to obtain accurate measurement. After adjustment, the flexures and bolt connections are welded to the plates to insure continued accuracy.

The weighing device of the invention is very flexible and stable. Thus, if desired both forks may be moved to one side, and only one cell need be used on one end of the plate structure. The flexure arrangement also provides a very short profile between the plates, and the overall arrangement has no real practical limit as far as weight capacity is concerned.

I claim:

1. A weighing device for use with a fork lift truck and the like having forks to lift loads comprising:
    a stationary plate mounted to the fork lift truck,
    a moveable plate,
    first flexure means mounted to the moveable and stationary plates to maintain the plates in substantially vertical parallel relationship, the forks being mounted to the moveable plate, the weight of loads introduced on the forks causing the moveable plate to be pulled vertically downwardly,
    load cell means interposed between the stationary and moveable plates,
    second and third flexure means coupled to opposite ends of the load cell means,
    first and second mounting means connecting the second and third flexure means to the stationary and moveable plates respectively, the second and third flexure means responding in equal and opposite direction to bending moments resulting from the cantilever effect caused by the location of loads on the forks from toe to heel to prevent the load cell means from being responsive to said cantilever effect, the load cell means being responsive to vertical tension forces transmitted thereto by loads under measurement on the forks to derive an accurate indication of the weight thereof.

2. The weighing device recited in claim 1 wherein the second and third flexure means each comprises structural rods.

3. The weighing device recited in claim 1 further comprising overload means preset to limit the vertical downward movement of the moveable plate to prevent damage to the load cell means due to overloading the forks.

4. The weighing device recited in claim 1 wherein the load cell means comprises:
    first and second combinations of a load cell with second and third flexure means connected to opposite ends thereof interposed and connected between the stationary and moveable plates respectively, the first and second combinations being located at the opposite sides of the weighing device formed by the stationary and moveable plates.

5. The weighing device recited in claim 1 wherein the first flexure means comprise four individual flexure elements mounted to the stationary and moveable plates at the four side corners formed thereby and means to adjust the four individual flexure elements prior to rigidly mounting same to obtain accurate weight measurements.

6. The weighing device recited in claim 2 further comprising overload means preset to limit the vertical downward movement of the moveable plate to prevent damage to the load cell means due to overloading the forks.

7. The weighing device recited in claim 6 wherein the overload means are further operative to prevent the moveable plate from being pulled away from the stationary plate due to overloads on the forks to prevent damage to the load cell means.

8. The weighing device recited in claim 7 further comprising stop means operative to limit the vertically upward movement of the forks in the event materials are caught thereunder to prevent damage to the load cell means.

9. The weighing device recited in claim 3 wherein the overload means are further operative to prevent the moveable plate from being pulled away from the stationary plate due to overloads on the forks to prevent damage to the load cell means.

10. The weighing device recited in claim 9 further comprising stop means operative to limit the vertically upward movement of the forks in the event materials are caught thereunder to prevent damage to the load cell means.

11. The weighing device recited in claim 5 wherein the second and third flexure means each comprises structural rods.

12. The weighing device recited in claim 11 wherein the load cell means comprises:
first and second combinations of a load cell with second and third flexure means connected to opposite ends thereof interposed and connected between the stationary and moveable plates respectively, the first and second combinations being located at the opposite sides of the weighing device formed by the stationary and moveable plates.

13. The weighing device recited in claim 12 further comprising overload means preset to limit the vertical downward movement of the moveable plate to prevent damage to the load cell means due to overloading the forks.

14. The weighing device recited in claim 13 wherein the overload means are further operative to prevent the moveable plate from being pulled away from the stationary plate due to overloads on the forks to prevent damage to the load cell means.

15. The weighing device recited in claim 14 further comprising stop means operative to limit the vertically upward movement of the forks in the event materials are caught thereunder to prevent damage to the load cell means.

* * * * *